United States Patent
Murata et al.

(10) Patent No.: US 6,798,488 B2
(45) Date of Patent: Sep. 28, 2004

(54) METHOD AND APPARATUS FOR FABRICATING LIQUID CRYSTAL DISPLAY DEVICE USING AN ELECTROSTATIC CHUCK

(75) Inventors: Satoshi Murata, Kawasaki (JP); Hiroyuki Sugimura, Kawasaki (JP); Norimichi Nakayama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/253,098

(22) Filed: Sep. 24, 2002

(65) Prior Publication Data

US 2003/0063251 A1 Apr. 3, 2003

(30) Foreign Application Priority Data

Oct. 1, 2001 (JP) ........................................ 2001-305612

(51) Int. Cl.[7] .................................................. G02F 1/13
(52) U.S. Cl. ........................................ 349/187; 349/153
(58) Field of Search ................................ 349/153, 187; 118/664

(56) References Cited

U.S. PATENT DOCUMENTS 6,222,603 B1 * 4/2001 Sakai et al. .................. 349/153

2002/0062787 A1 * 5/2002 Hashizume et al. ......... 118/664

FOREIGN PATENT DOCUMENTS

| JP | 8-190099 | 7/1996 |
|---|---|---|
| JP | 2000-66163 | 3/2000 |

* cited by examiner

*Primary Examiner*—Tarifur R. Chowdhury
*Assistant Examiner*—P. R. Akkapeddi
(74) *Attorney, Agent, or Firm*—Greer, Burns & Crain, Ltd.

(57) ABSTRACT

A liquid crystal display device has a liquid crystal inserted between first and second substrates and surrounded by a peripheral seal. The liquid crystal is dripped onto the first substrate in an area defined by the seal of the first substrate. The first substrate and the second substrate are joined or bonded together under pressure in a vacuum chamber. The chamber is then exposed to the atmosphere while keeping the first substrate and the second substrate under pressure. The pressure is then released and thereafter light is irradiated onto the peripheral seal. The vacuum chamber includes upper and lower surface plates to support the substrates. The surface plate includes an electrostatic chuck and a vacuum attraction passage provided in the chuck.

6 Claims, 4 Drawing Sheets

METHOD AND APPARATUS FOR FABRICATING LIQUID CRYSTAL DISPLAY DEVICE USING AN ELECTROSTATIC CHUCK

BACKGROUND OF THE INVENTION

1. Field of the Invention

The present invention relates to a method and an apparatus of fabricating a liquid crystal display device.

2. Description of the Related Art

A liquid crystal display device comprises first and second substrates, and a liquid crystal inserted between the substrates. One of the first and second substrates is a TFT substrate supporting TFTs, for example, and the other substrate is a color filter substrate supporting color filters. The first substrate is formed with a peripheral seal made of a photo-curable sealing material, and the peripheral seal is set by being irradiated with ultraviolet light after the first and second substrates are joined together. The liquid crystal is arranged in an area surrounded by the peripheral seal.

In the conventional method of fabricating a liquid crystal display device, an injection hole is formed in the peripheral seal and, after joining the first and second substrates together, a liquid crystal is injected in a vacuum chamber through the injection hole formed in the peripheral seal. After that, the injection hole of the peripheral seal is closed, and the liquid crystal panel comprising the first and second substrates is taken out of the vacuum chamber, and the peripheral seal is pressed to form an appropriate cell gap. The peripheral seal is set by being irradiated with ultraviolet light.

Japanese Unexamined Patent Publications No. 8-190099 and No. 2000-66163 disclose a method, of fabricating a liquid crystal display device, which is called a drip-injection method. In the drip-injection method, a peripheral seal is formed on the first substrate and a liquid crystal is dripped onto the substrate. Then, the first substrate and the second substrate are joined together under pressure in a vacuum chamber. After that, the pressure is released from the first and second substrates, and the first and second substrates are exposed to the atmospheric pressure. The peripheral seal is set by the ultraviolet light irradiated thereonto. According to the drip-injection method, the fabrication process is shortened and the fabrication cost of the liquid crystal display device is reduced.

In the drip-injection method, the first substrate and the second substrate are joined under pressure in a vacuum chamber. For this purpose, the first substrate and the second substrate are supported by respective support members in the vacuum chamber. These support members are called an upper surface plate and a lower surface plate. The first substrate onto which the liquid crystal is dripped is fixed to the lower surface plate, while the second substrate is fixed to the upper surface plate. The upper surface plate is movable, and the first substrate and the second substrate can be joined together under pressure in the vacuum chamber, by moving the upper surface plate toward the lower surface plate.

The first substrate and the second substrate are fixed to the upper and lower surface plates, respectively, by electrostatic chucks. The electrostatic chuck is generally used as a means for holding the substrate in the semiconductor fabrication process. The electrostatic chuck, however, sometimes has an insufficient attractive force to attract the glass substrate used as a substrate of the liquid crystal display device. Unless the surface of the glass substrate is in close contact with the surface of the electrostatic chuck, for example, the electrostatic chuck may not be able to hold the glass substrate sufficiently. In view of this, an attempt has been made to hold the glass substrate sufficiently on the upper and lower surface plates using both attraction by the electrostatic chuck and attraction by a vacuum.

In the case where means for holding the glass substrate by the electrostatic attraction and the vacuum attraction are both used, the first substrate and the second substrate are pressed and attached to each other in a vacuum environment, and the upper surface plate is moved away from the lower surface plate in such a manner as to release the pressure in the vacuum chamber, after which the vacuum chamber is exposed to the atmosphere. In the case where the pressure exerted on the substrates is released in a vacuum environment, however, the peripheral seal would be extended from the compressed state as the compressive force is removed, with the result that the peripheral seal would assume an irregular shape, thereby leading to the problems of leakage of the liquid crystal or gap failure.

SUMMARY OF THE INVENTION

The object of the present invention is to provide a method and an apparatus of fabricating a liquid crystal display device in which the substrates can be properly held when the substrates are joined together.

According to the present invention, there is provided a method of fabricating a liquid crystal display device including first and second substrates, a liquid crystal inserted between the first and second substrates, and a seal arranged between the first and second substrates to surround the liquid crystal, the method comprising the steps of forming a seal on the first substrate, dripping a liquid crystal onto the first substrate within an area defined by the seal of the first substrate, joining the first and second substrates together under pressure in a vacuum chamber, exposing the vacuum chamber to the atmosphere while keeping the first and second substrates under pressure, and setting the seal after releasing the pressure from the first and second substrates.

Also, according to the present invention, there is provided an apparatus of fabricating a liquid crystal display device, comprising a chamber into which a vacuum and an atmospheric pressure can be introduced, a first support member supporting the first substrate on which a seal is formed and onto which the liquid crystal is dripped within an area defined by the seal, in the chamber, a second support member supporting the second substrate in the chamber, an electrostatic chuck arranged in at least one of the first and second support members and a vacuum attraction passage arranged in the electrostatic chuck for fixing the corresponding one of the substrates to the corresponding one of the support members, a vacuum attraction line for supplying a vacuum into the vacuum attraction passage, and a communication line for connecting said vacuum attraction passage to the interior of the chamber in communication.

In the configuration described above, the first substrate and the second substrate, after being joined together in the vacuum chamber, are exposed to the atmosphere while being kept under pressure. Therefore, the pressure that has thus far been exerted on the substrates can be released in the atmosphere, thereby eliminating the irregularity of the shape of the peripheral seal.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Embodiments of the invention will be explained below with reference to the drawings.

Figure 1:
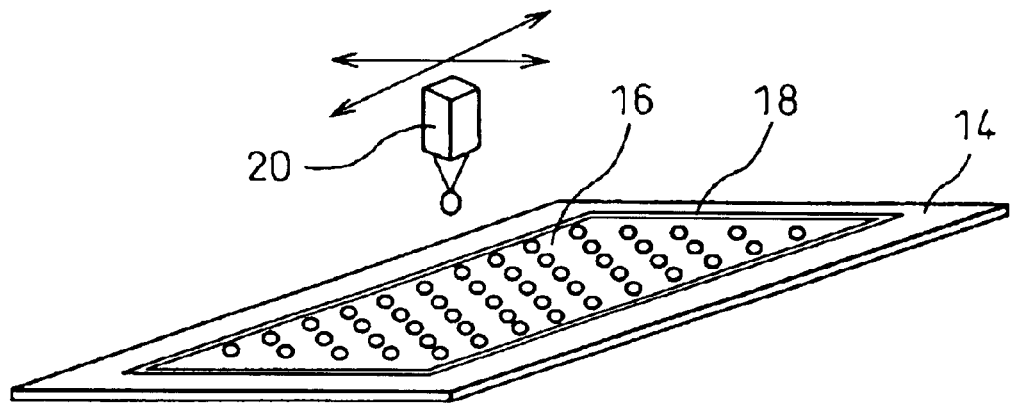
FIG. 1 is a perspective view showing one of substrates of a liquid crystal display device according to an embodiment of the present invention.
Figure 2:
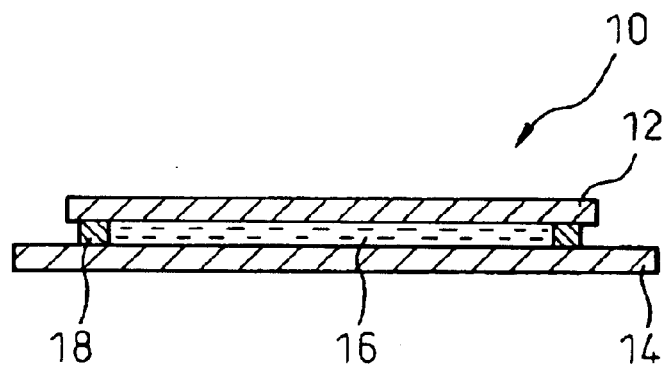
FIG. 2 is a sectional view schematically showing the liquid crystal display device including the substrate of FIG. 1.

FIG. 1 is a perspective view showing one of substrates of a liquid crystal display device according to an embodiment of the present invention, and FIG. 2 is a sectional view schematically showing the liquid crystal display device including the substrate shown in FIG. 1.

In FIG. 2, the liquid crystal display device 10 comprises first and second substrates 12 and 14, a liquid crystal 16 inserted between the first and second substrates 12 and 14, and a seal (peripheral seal) 18 arranged between the first and second substrates 12 and 14 in such a manner as to surround the liquid crystal 16. The liquid crystal display device 10 is of an active matrix type, and one of the substrates is a TFT substrate having TFTs formed thereon while the other substrate is a color filter substrate having a color filter formed thereon. The liquid crystal display device 10 is fabricated by the drip-injection method.

In FIG. 1, the liquid crystal 16 is dripped onto the second substrate 14 in the form of liquid drops from a dispenser 20. The dispenser 20 ejects the liquid crystal 16 in an area defined by the peripheral seal 18 while moving as indicated by arrows in FIG. 1. The sealing material forming the peripheral seal 18 is made of a UV curable adhesive resin or an adhesive resin adapted to be set by means of the combined use of UV and heat. Such a sealing material is applied on the second substrate 14 and set later. The first substrate 12 is coated with adhesive spacers composed of spacers coated with an adhesive. The spacer spray process can be eliminated by providing posts in place of the spacers.

Figure 3:
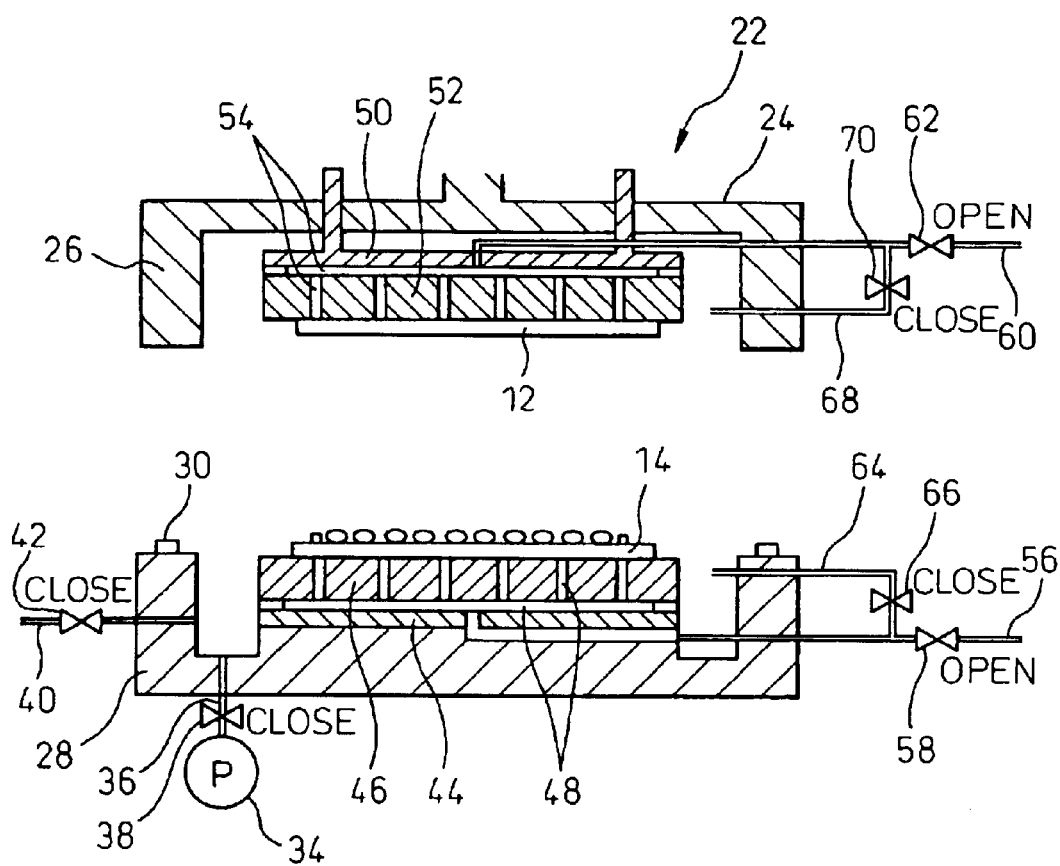
FIG. 3 is a sectional view showing a method and an apparatus of fabricating a liquid crystal display device according to the present invention.
Figure 4:
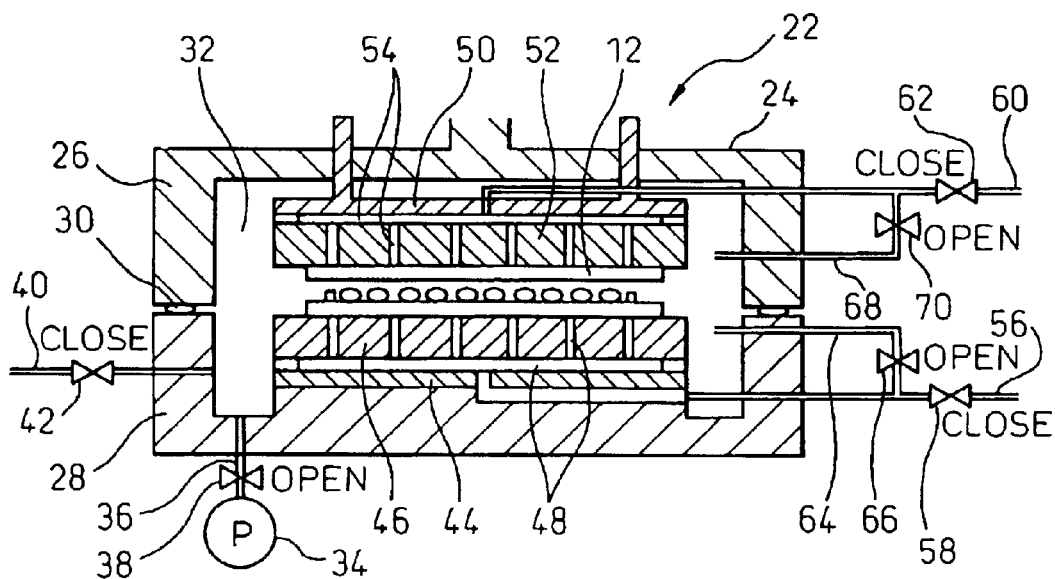
FIG. 4 is a sectional view showing the fabrication apparatus of FIG. 3 with the upper housing moved toward the lower housing in FIG. 3.

FIG. 3 is a sectional view showing a method and an apparatus for fabricating a liquid crystal display device according to the invention. FIG. 4 is a sectional view showing the fabrication apparatus of FIG. 3 with an upper housing moved toward a lower housing in FIG. 3, and FIG. 5 is a sectional view showing the fabrication apparatus of FIG. 4 with the upper surface plate moved toward the lower surface plate in FIG. 4.

Figure 5:
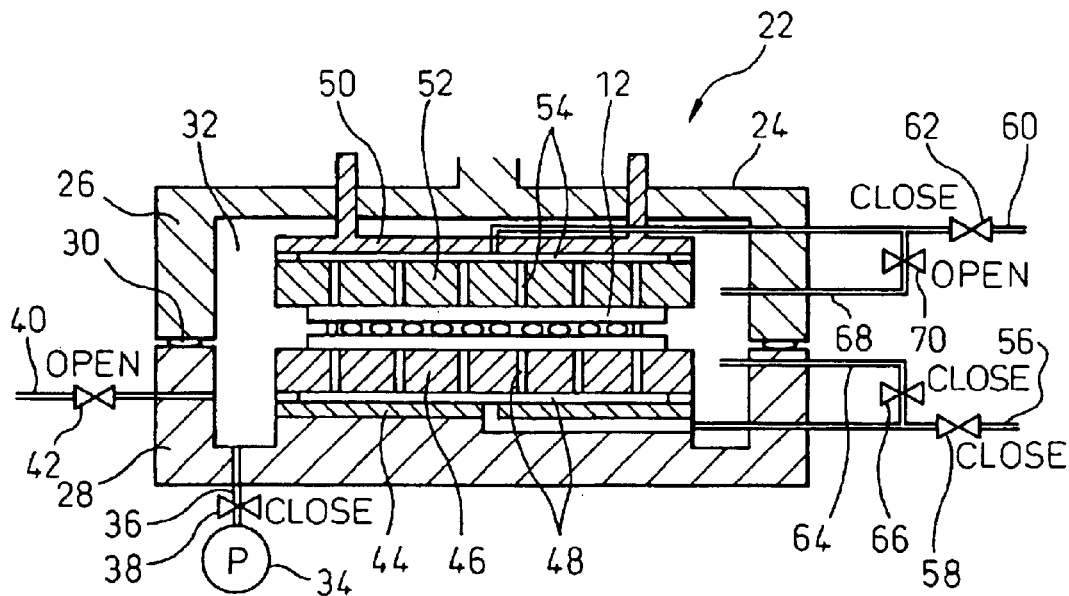
FIG. 5 is a sectional view showing the fabrication apparatus of FIG. 4 with the upper surface plate moved toward the lower surface plate in FIG. 4.

In FIGS. 3 to 5, the apparatus 22 of fabricating the liquid crystal display device includes a chamber 24. The chamber 24 comprises a movable upper housing 26 and a fixed lower housing 28. A packing 30 is interposed between the upper housing 26 and the lower housing 28, and the interior 32 of the chamber 24 forms a hermetically sealed space.

The chamber 24 has a vacuum passage 36 connected to a vacuum pump 34 for introducing a vacuum and a purge passage 40 for introducing the atmospheric pressure. A valve 38 is arranged in the vacuum passage 36, and a valve 42 is arranged in the purge passage 40. The purge passage 40 is adapted to introduce an inert gas such as nitrogen into the chamber 24.

The lower surface plate 44 is arranged in the lower housing 28, and supports the second substrate 14 having the peripheral seal 18 formed thereon and the liquid crystal 16 dripped thereonto in the area defined by the peripheral seal 18. The lower surface plate 44 includes an electrostatic chuck 46, which in turn includes a vacuum attraction passage 48. The electrostatic chuck 46 includes a well-known electrode (not shown), and the second substrate 14 arranged on the electrostatic chuck 46 is fixed to the latter by the electrostatic force generated by supplying power to the electrode. The vacuum attraction passage 48 is open to the surface of the electrostatic chuck 46, and the second substrate 14 arranged on the electrostatic chuck 46 is also fixed to the latter by the force of a vacuum supplied from a vacuum source.

The upper surface plate 50 is arranged movably in the upper housing 26 and supports the first substrate 12. The upper surface plate 50 includes an electrostatic chuck 52, which in turn includes a vacuum attraction passage 54. The electrostatic chuck 52 has a well-known electrode (not shown), and the first substrate 12 arranged under the electrostatic chuck 52 is fixed to the latter by the electrostatic force generated by energizing the electrode. The vacuum attraction passage 54 is open to the surface of the electrostatic chuck 52, and the second substrate 14 arranged under the electrostatic chuck 52 is also fixed to the latter by the force of a vacuum supplied from a vacuum source.

Further, a vacuum attraction line 56 is connected to the vacuum attraction passage 48 of the electrostatic chuck 46 of the lower surface plate 44 thereby to supply a vacuum to the vacuum attraction passage 48. The vacuum attraction line 56 includes a valve 58. The vacuum attraction line 56 extends through the interior 32 of the chamber 24. A vacuum attraction line 60 is connected to the vacuum attraction passage 54 of the electrostatic chuck 52 of the upper surface plate 50 to thereby supply a vacuum to the vacuum attraction passage 54. The vacuum attraction line 60 includes a valve 62, and extends through the interior 32 of the chamber 24.

Further, a pressure equalizing line 64 is connected to the vacuum attraction line 56 at a point downstream of the valve 58 of the vacuum attraction line 56 on the one hand and to the interior 32 of the chamber 24 on the other hand. The pressure equalizing line 64 includes a valve 66. A pressure equalizing line 68 is connected to the vacuum attraction line 60 at a point downstream of the valve 62 of the vacuum attraction line 60 on the one hand and to the interior 32 of the chamber 24 on the other hand. The pressure equalizing line 68 includes a valve 70.

In FIG. 3, the movable upper housing 26 is apart from the lower housing 28, and the chamber 24 is open. Under this condition, the first and second substrates 12 and 14 are mounted on the electrostatic chuck 52 of the upper surface plate 50 and the electrostatic chuck 46 of the lower surface plate 44, respectively. In the process, the valves 58 and 62 of the vacuum attraction lines 56 and 60 are open, while the valves 66 and 70 of the pressure equalizing lines 64 and 68 are closed.

The vacuum is introduced to the vacuum attraction passages 48 and 54 of the electrostatic chucks 46 and 52, so that the first and second substrates 12 and 14 are closely attracted to the electrostatic chucks 46 and 52, respectively, by the vacuum attractive force. At the same time or thereafter, an electric voltage is supplied to the electrodes of the vacuum chucks 46 and 52, so that the first and second substrates 12 and 14 are attracted to the electrostatic chucks 46 and 52 by the electrostatic attractive force. If the vacuum attractive force is not provided, the effect of the electrostatic attractive force would be reduced unless the surfaces of the first and second substrates 12 and 14 are flat. In view of the fact that the electrostatic attractive force is exerted after the vacuum attraction, however, the first and second substrates 12 and 14 are securely held by the electrostatic chucks 46 and 52.

In FIG. 4, the movable upper housing 26 is pressed against the lower housing 28, and the chamber 24 is closed. After the first and second substrates 12 and 14 are electrostatically attracted to the electrostatic chucks 46 and 52, respectively, or when the state shown in FIG. 4 is established, the valves 58 and 62 of the vacuum attraction lines 56 and 60 are both closed and the valves 66 and 70 of the pressure equalizing lines 64 and 68 are both opened. As a result, the pressure or the vacuum in the interior 32 of the chamber 24 is not released outside through the vacuum attraction lines 56 and 60, and the vacuum attraction passages 48 and 54 of the electrostatic chucks 46 and 52 are connected to the interior 32 of the chamber 24 in such a manner that a fluid can pass therethrough, so that these portions assume the same pressure. The first and second substrates 12 and 14, after being electrostatically attracted to the electrostatic chucks 46 and 52, are securely held by the electrostatic chucks 46 and 52 by the electrostatic attractive force even though the pressure of the vacuum attraction passages 48 and 54 of the electrostatic chucks 46 and 52 is reduced.

Under this condition, the valve 38 of the vacuum passage 36 is opened, so that the vacuum is introduced into the interior 32 of the chamber 24. The interior 32 of the chamber 24 is exhausted to, say, about 1 Pa. This vacuum acts on the surfaces of the first and second substrates 12 and 14 on the one hand and is introduced into the vacuum attraction passages 48 and 54 of the electrostatic chucks 46 and 52 through the pressure equalizing lines 64 and 68 on the other hand. With the same vacuum pressure applied to the upper and lower sides of the first and second substrates 12 and 14, therefore, the first and second substrates 12 and 14 are held by the electrostatic chucks 46 and 52 by the electrostatic attractive force. If the pressure equalizing lines 64 and 68 are not provided, the first and second substrates 12 and 14 may come off from the electrostatic chucks 46 and 52 if the vacuum introduced to the interior 32 of the chamber 24 from the vacuum passage 36 acts on one surface of the first and second substrates 12 and 14 so strongly as to overcome the electrostatic attractive force.

Then, in FIG. 5, the upper surface plate 50 moves relative to the upper housing 26 toward the lower surface plate 44. The first substrate 12 is pressed toward the second substrate 14, so that the surface of the first substrate 12 comes into contact with the peripheral seal 18 of the second substrate 14 and the spacers of the first substrate 12 comes into contact with the surface of the second substrate 14. The first substrate 12 is initially joined to the second substrate 14 and the first substrate 12 is then precisely and finally joined to the second substrate 14, by pressing the upper surface plate 50 toward the lower surface plate 44 under a pressure of about 10 to 500 kg.

The peripheral seal 18 is compressed, and when the cell gap between the first substrate 12 and the second substrate 14 assumes a proper value, the movement of the upper surface plate 50 toward the lower surface plate 44 is stopped. In this way, the first substrate 12 and the second substrate 14 are joined or bonded to each other in the vacuum environment, while the liquid crystal 16 in the form of liquid drops spreads along the surface of the second substrate 14 so that no air remains in the liquid crystal 16.

After completion of the joining of the first substrate 12 and the second substrate 14, the electrostatic chuck 52 is deenergized, and the valve 42 of the purge passage 40 is opened, while the pressure is maintained between the first substrate 12 and the second substrate 14. An inert gas, such as nitrogen, is introduced into the chamber 24 through the purge passage 40 so that the chamber 24 is opened to the atmosphere. At the same time, the valve 70 of the pressure equalizing line 68 is opened and the valve 66 of the pressure equalizing line 64 is closed. Nevertheless, both the valves 66 and 70 of the pressure equalizing lines 64 and 68 may be open.

The inert gas acts on the surfaces of the first and second substrates 12 and 14 on the one hand and is introduced to the vacuum attraction passage 54 of the electrostatic chuck 52 through the pressure equalizing line 68 on the other hand. The vacuum is applied to the vacuum attraction passage 54 of the electrostatic chuck 52. Also, the electrostatic chuck 46 is deenergized.

Then, the upper surface plate 50 is moved away from the lower surface plate 44. The same pressure is exerted on the upper and lower sides of the first substrate 12 through the pressure equalizing line 68, and therefore the electrostatic chuck 52 rising with the upper surface plate 50 can smoothly separate from the first substrate 12. If the vacuum is exerted on the upper side of the first substrate 12, the first substrate 12 would be dragged by the electrostatic chuck 52, probably resulting in incomplete bonding. During the time when the upper surface plate 50 rises, the valve 66 of the pressure equalizing line 64 is closed and therefore the vacuum acts on the lower side of the second substrate 14, so that the second substrate 14 (i.e. the liquid crystal panel) is held by the electrostatic chuck 46 of the lower surface plate 44.

Upon completion of movement of the upper surface plate 50, the valve 66 of the pressure line 64 is opened. The upper housing 26 is moved away from the lower housing 28 and the chamber 24 is opened. After that, ultraviolet light is irradiated onto the peripheral seal 18 thereby to set the peripheral seal 18.

Figure 6:
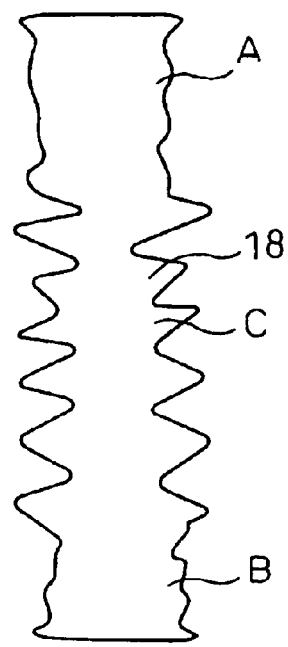
FIG. 6 is a view showing an example of the peripheral seal having an irregular shape.

As described above, if the pressure on the first substrate 12 and the second substrate 14 is released while the chamber 24 is in the vacuum state after completion of the joining of the first substrate 12 and the second substrate 14, the shape of the peripheral seal 18 would become irregular, thereby leading to the problem of the liquid crystal leakage or the gap failure. FIG. 6 is a view showing an example of the peripheral seal 18 in such a case. The end portions A and B of the peripheral seal 18 are normal, whereas the intermediate portion C of the peripheral seal 18 is locally thinned because the peripheral seal 18 is extended upward as the compressive force is released from the compressed state. According to the present invention, the atmospheric pressure is restored while maintaining the pressure on the first substrate 12 and the second substrate 14, and the pressure is released under atmospheric pressure. Therefore, the peripheral seal 18 can be prevented from being extremely deformed.

Figure 7:
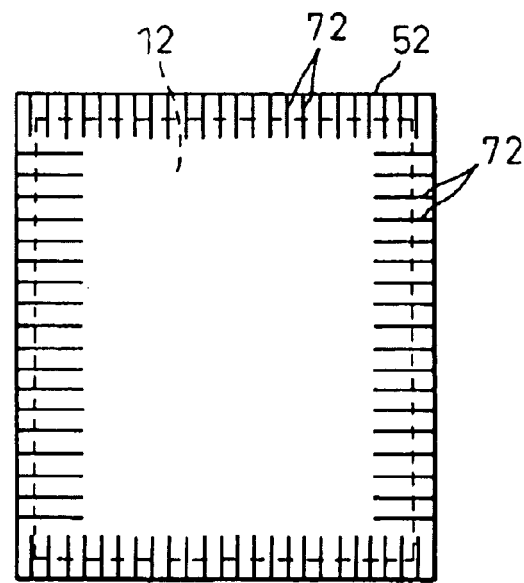
FIG. 7 is a view showing another example of the electrostatic chuck.

FIG. 7 is a view showing another example of the electrostatic chuck. Grooves 72 are formed in the peripheral portion of the surface of the electrostatic chuck 52 across the corresponding ends of the first substrate 12. In FIG. 7, the grooves 72 are formed so as to extend perpendicular to the side of the square electrostatic chuck 52 and in a row parallel to the side of the chuck 52. By doing so, the air can be prevented from remaining between the electrostatic chuck 52 and the first substrate 12 at the time of exhaustion in a vacuum. Also, the inert gas enters the gap between the electrostatic chuck 52 and the first substrate 12 at the time of purge (release to atmosphere), and therefore the separation of the first substrate 12 from the electrostatic chuck 52 can be promoted.

As described above in greater detail, according to the present invention, the liquid crystal display device can be fabricated securely at a lower cost by the drip-injection method.

What is claimed is:

1. A method of fabricating a liquid crystal display device including first and second substrates, a liquid crystal inserted between said first and second substrates, and a seal arranged between said first and second substrates to surround said liquid crystal, said method comprising the steps of:

arranging the seal on said first substrate;

dripping a liquid crystal onto said first substrate within an area defined by the seal of said first substrate;

joining said first and second substrates together under pressure in a vacuum chamber, by pressing one of said first and second substrates toward the other by an actuating means;

exposing said vacuum chamber to an atmosphere while keeping said first and second substrates under pressure by said actuating means; and setting said seal after removing the pressure exerted on said first and second substrates.

2. The method according to claim 1, wherein at least one of said first and second substrates is fixed to a support member by attraction of an electrostatic chuck and attraction by a vacuum supplied in a vacuum attraction passage arranged in said electrostatic chuck.

3. The method according to claim 2, wherein said vacuum attraction passage is connected to the internal space in said vacuum chamber in a fluid communication manner.

4. An apparatus for fabricating a liquid crystal display device including first and second substrates, a liquid crystal inserted between said first and second substrates, and a seal arranged between said first and second substrates to surround said liquid crystal, said apparatus comprising:

a chamber into which a vacuum and an atmospheric pressure can be selectively introduced;

a first support member supporting the first substrate on which said seal is arranged and onto which a liquid crystal is dripped within an area defined by said seal, in said chamber; and a second support member supporting said second substrate in said chamber, one of said first and second support members being movable;

an electrostatic chuck arranged in at least one support member for fixing the corresponding one of the substrates to said movable one support member;

a vacuum attraction passage formed in the electrostatic chuck for fixing the substrate to the support member;

a vacuum attraction line having a first end connected to a vacuum source and a second end connected to the vacuum attraction passage for supplying a vacuum into said vacuum attraction passage, said vacuum attraction line having a first valve arranged outside said chamber; and a communication line having a first end connected to said vacuum attraction line between said first valve and said vacuum attraction passage and a second end opened to the interior of said chamber for connecting said vacuum attraction passage to the interior of said chamber in communication, said communication line having a second valve arranged outside said chamber.

5. The apparatus according to claim 4, wherein a plurality of grooves are formed in the peripheral portion of the surface of said electrostatic chuck across the corresponding ends of the substrate to introduce an atmospheric pressure between said electrostatic chuck and said substrate when an atmospheric pressure is introduced in said chamber.

6. The apparatus according to claim 5, wherein said grooves are arranged in at least three sides.

* * * * *